INVENTOR.
Harry P. Kling
BY
Robert L. Berry
ATTORNEY 3,422,523
PROCESS FOR FABRICATING NUCLEAR
REACTOR FUEL ELEMENTS
Harry P. Kling, Glenarm, Md., assignor to Martin-
Marietta Corporation, New York, N.Y., a corporation of Maryland
Filed June 26, 1963, Ser. No. 290,852
U.S. Cl. 29—420.5                    10 Claims
Int. Cl. B22f *3/24;* B23k *31/02;* G21c *3/30*

ABSTRACT OF THE DISCLOSURE

Nuclear fuel elements are prepared by encapsulating a sintered fuel material in a foil envelope, evacuating the envelope, forming the sealed envelope into tube, cladding the tube, drawing the assembly to a desired smaller sized tube.

---

This invention relates to nuclear reactor fuel elements and, more particularly, to an improved process for efficiently fabricating high quality metal clad cermet dispersion type fuel elements.

Prior art processes for fabricating metal clad tubular fuel elements generally comprise an initial step of blending a properly proportioned mixture of powderous fissionable material, such as uranium dioxide, and a powderous matrix metal, such as stainless steel. The mixed powders are then passed between a pair of rollers which compact them into a green strip of sufficient strength so that it may be handled and cut. This green strip is then trimmed into a suitable size and placed into a hydrogen atmosphere furnace at an elevated temperature for a sufficient period of time to effect a sintering thereof. After being sintered, the strip is subjected to one or more cold rolling operations followed by a final sintering process. Wrought sheet metal pieces of the same thicknes and width as the fueled strip and relatively short in length are then welded to each end of the strip and the welded assembly formed into a tube having a longitudinal butt seam by the action of various dies and grooved rollers.

After suitably cleaning the fueled tube, it is inserted between inner and outer cladding tubes of wrought metal. These three tubes are brought into intimate contact by a series of tube drawing passes and heat treatments which effect a diffusion bond therebetween. The final steps in producing the metal clad tubular fuel element consist in straightening, sizing, cleaning and inspecting the bonded assembly. In actual practice many more operations, such as for example accountability weighings, take place than have been specifically set forth above.

This process for forming tubular fuel elements has exhibited certain deficiencies which are primarily attributable to the fact that the fissionable material in the fueled strip is exposed to the working environment throughout the process until the tubular cermet strip is inserted between the cladding tubes. The first of these deficiencies is that fuel particles are mechanically removed from the surface of the fueled strip at numerous stages of the fabricating process, in particular those stages wherein the fueled strip is deformed, thus contaminating the equipment and work area and thereby creating a potential hazard to the workers. It frequently becomes necessary to suspend manufacturing operations in order that one or more portions of the manufacturing area may be decontaminated. This is obviously not only a costly situation but also one which represents undesirable working conditions for the workmen.

Cleaning of the tubular core prior to its being inserted between the cladding tubes is never really complete, resulting in fine particles of the fuel material remaining on both surfaces of the formed tube which subsequently interfere with the development of a sound metallurgical bond between the fueled matrix and the clad metal.

The continuous loss of fissionable material during the fabricating process is essentially uncontrollable and unreproducible. Consequently, there is not only an uncertainty as to the exact amount of fuel in a finished fuel element, but also an unrecoverable loss of very expensive fissionable material and an increase in the amount of recoverable scrap with an attendant increase in reprocessing costs. Another factor is that extreme precaution must be exercised in all cleaning operations where the tube is immersed in a hydrogenous liquid in order to avoid criticality accidents.

Due to the high susceptibility of the core materials to oxidation, it is impractical to use a hot rolling process to reduce the thickness of the cermet strip. Cold rolling reduction not only limits the amount of densification which may be obtained during this stage of the process, but also causes a realtively high amount of fuel particle fracture. The resulting fuel matrix as finished into a nuclear fuel element is somewhat permeable and therefore subject to water logging in the event of a cladding perforation and unreliable as to fission gas retention.

More briefly stated, the fact that the fissionable material in the cermet strip is exposed to the surrounding environment until the time it is inserted between the cladding tubes causes prior art processes to be relatively expensive and hazardous, to result in questionable clad-to-core bonds, to increase the amount of fuel particle fracture, to produce undesirably permeable fuel matrixes and to effect a random variation in fuel loading of the fuel elements.

In addition, it will be noted that it is not possible to weld the longitudinal butt seam of the tubular fueled region as the weld zone would become embrittled by the fuel particles. The dead end pieces may be welded as desired but the fueled region has an unbonded butt joint after the three tubes have been assembled. During subsequent operations, the stresses between the three tubes are primarily in a radial direction and, consequently, only a marginal bond is developed along the longitudinal butt seam in the fueled region. This joint is particularly questionable at each end thereof where the longitudinal seam and the circumferential seams of attachment between the dead end pieces and the fueled section intersect. The bond between the fueled core and clad is generally acceptable when examined metallographically or by a peel test. When examined metallographically, the longitudinal seam generally appears bonded over most of the contact surface but frequently exhibits a small open pore at one or both sides of the fueled region on the longitudinal seam caused by the corners of the fueled strip being slightly rounded and not fitting precisely as the butt joint is closed.

Since a destructive evaluation cannot be applied economically to a production run, it is highly desirable to employ a non-destructive method of inspection. Unfortunately all such inspection techniques employed for examining tubular fuel elements produced by prior art processes exhibit ambiguous results. The most promising non-destruction inspection method in use today is an ultrasonic process which has been developed to the point where tubular fuel elements can be scanned automatically by ultrasonic transmission through one wall of the tube. The results of such a test must be evaluated by comparison with the destructive evaluation of selected tubes. While the longitudinal seam is usually apparent in an ultrasonic trace, destructive inspection frequently shows that it is well bonded. Traces frequently indicate irregular areas in non-seam regions which may be interpreted as patches where there is poor bonding of core to clad, but which appear perfectly sound under destructive examination. These latter indications probably result from a localized looseness of the fuel particles in the matrix which leads to excessive attenuation of the ultrasonic beam in the fueled region. Consequently, it has heretofore been impossible to define discriminating criteria for rejecting metal clad tubular fuel elements produced by processes of the prior art.

Prior art processes for fabricating metal clad flat plate fuel elements generally have included the step of forming a die-pressed compact of fissionable material and matrix metal which is subsequently inserted into a "picture frame" and hot rolled to final thickness. These prior art processes result in a metal clad flat plate fuel element having a greater amount of fuel particle fracture and less uniform clad thickness than similar elements produced by the process of the present invention.

It is therefore a primary object of the present invention to provide a process for efficiently fabricating high quality metal clad cermet dispersion type fuel elements. The process of this invention permits metal clad tubular fuel elements to be produced which exhibit greater densification, reduced permeability and improved interface bonds than heretofore possible. In addition, metal clad tubular fuel elements may be produced with a minimum loss of fissionable material during the fabrication process thereby effecting excellent uniformity between elements and less contamination of the manufacturing area. Another object of this invention is to provide a process to produce metal clad tubular fuel elements which may be readily and accurately checked for bonding defects. The process provided herein also permits metal clad flat plate fuel elements to be produced having greater uniformity of clad thickness and less fuel particle fracture than those produced by prior art techniques.

The novel features that are considered characteristic of the invention are set forth with particularity in the appended claims. The invention itself, however, both as to its organization and its method of operation together with additional objects and advantages thereof, will best be understood from the following description of specific embodiments when read in connection with the accompanying drawings, wherein like reference characters indicate like parts throughout the several figures and in which:

Figure 1:
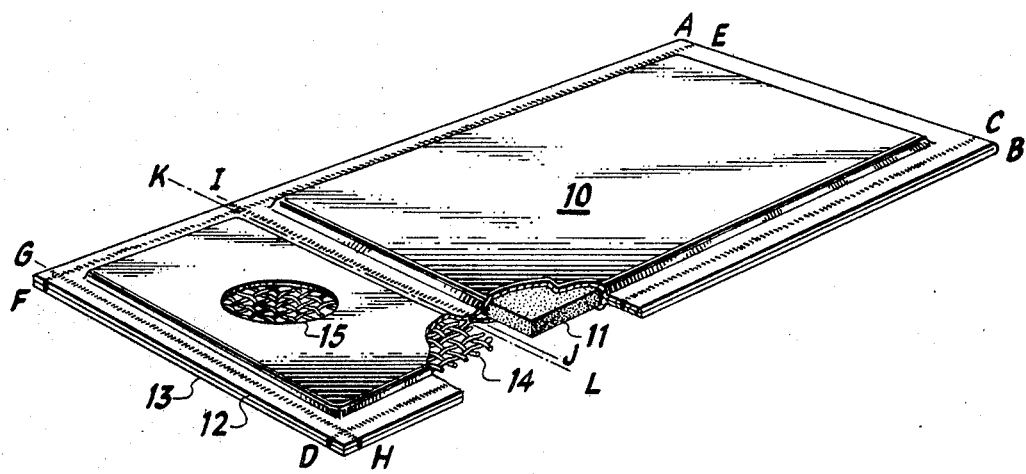
FIGURE 1 is a diagrammatic view in perspective of an encapsulated cermet strip immediately prior to the evacuation step in the process of this invention for fabricating metal clad tubular fuel elements.

Briefly, this invention comprises encapsulating a sintered strip of fissionable material and matrix metal in an evacuated metal envelope. This is accomplished in fabricating metal clad tubular elements by sandwiching the cermet strip between a pair of metal foils, sealing the metal foils together around three sides of the cermet strip, evacuating the interior of the assembly and then welding the metal foils together along the fourth side of the cermet strip. In a process for fabricating metal clad flat plate fuel elements, a cermet strip is positioned in a slightly thinner metal frame, the framed cermet strip sandwiched between a pair of metal foils and then the assembly is evacuated and welded in a manner similar to that used in producing tubular fuel elements. In either case the encapsulated fueled strip is hot rolled to near final or final thickness, thereby increasing its density and producing a metallurgical bond between the fueled core and the metal envelope.

In forming metal clad tubular fuel elements by this process, the encapsulated cermet strip is provided with dead end pieces, cleaned, formed into an elongated tube, and inserted between a pair of cladding tubes. This three-tube assembly is then drawn to effect a metallurgical bond between the fueled tube and the metal cladding tubes and gas pressure bonded to improve the core-to-clad bond and the bond of the longitudinal butt seam of the tubular fueled core and to further densify the element. Ultrasonic inspection techniques may now be employed to check the bond along the longitudinal butt seam of the fueled core and between the fueled core and the metal cladding tubes with 100 percent reliability.

The invention will now be described in detail with reference being made to the drawings where appropriate.

In fabricating a metal clad tubular fuel element by the process of this invention, a green cermet fueled strip is first formed. This is accomplished by weighing the proper amounts of powderous fissionable material and powderous matrix metal and blending them into a homogeneous mixture. The homogeneous powderous mixture is placed in a hopper from which it is permitted to flow between a pair of horizontal rollers which compact the powders into a green strip of sufficient strength to permit subsequent handling. While this process is particularly well adapted to fuel elements having cores formed of uranium dioxide and stainless steel, it may be used to advantage in forming dispersion type fuel elements comprised of any powderous fissionable material, such as uranium nitride, uranium carbide and other refractory compounds of uranium, and powderous matrix metal, such as zirconium, columbium, aluminum, molybdenum, and tungsten and alloys of these metals.

After trimming the green strip to the desired dimensions, it is sintered to further increase its strength and density. This sintering operation is effected by heating the strip for a sufficient period of time under proper environmental conditions. For example, satisfactory results are obtained by heating strips formed of a mixture of uranium dioxide and stainless steel in a hydrogen furnace or under vacuum conditions to a temperature of 2100° F. for a period of approxmiately 1½ hours. Satisfactory results are likewise obtained in the case of cermet strips comprising a mixture of uranium dioxide and aluminum by heating the mixture to a temperature of approximately 930° F. for a period of approximately 1½ hours under vacuum conditions.

The next step in the process of this invention is to encapsulate the sintered cermet strip in a metal foil envelope. This process step may best be understood by referring to FIGURE 1. As therein illustrated, a metal foil sheet 10 is folded in half along a line AB to sandwich therein a sintered fueled strip 11. The open ends 12 and 13 of the metal foil sheet 10 extend well beyond the sintered fueled strip 11 to sandwich therebetween a wire screen 14 which is partially visible through an aperture 15 in the metal foil sheet 10. This assembly is welded along lines CD, EF and GH thereby completely enclosing the sintered fuel strip 11 and the wire screen 14. A suitable clamp (not shown) is positioned over the aperture 15 in the metal foil sheet 10 and connected to a vacuum pump (not shown) thereby to evacuate the interior of the sandwiched assembly. During this evacuation process, the screen 14 is positioned sufficiently close to the sintered fueled strip 11 to prevent atmospheric pressure from pressing the foils together to valve off the fueled region of the assembly from the vacuum pump. After the interior of the assembly has been evacuated, a weld is made along line IJ thereof. The vacuum pump is disconnected, the assembly cut into two parts along the line KL thereof and the section which includes the screen 14 discarded.

The material from which the metal foil sheet 10 is formed is preferably the same as the matrix metal employed in the fueled strip 11; however, satisfactory results may be obtained by using any metal which is compatible with both the matrix metal and the cladding tubes, the application of which will be described in considerable detail hereinafter. For example, if desirable a nickel foil envelope may be employed with a $UO_2$-stainless steel core and stainless steel cladding tubes. The metal foil sheet 10 is preferably as thin as possible, while still being capable of satisfactorily protecting the cermet strip during subsequent process steps, and typically is between .004 and .015 inch in thickness.

The encapsulated cermet strip is reduced to near final thickness by a series of hot rolling steps. This is most desirably accomplished by heating the encapsulated strip in a hydrogen furnace at a temperature approximating the previously mentioned sintering temperature for a sufficient period of time to effect a uniform heating of the entire assembly and then rolling the heated assembly under a sufficient pressure to produce an approximate 10–15 percent decrease in the thickness thereof. During this hot rolling procedure, the fueled strip is further densified and the metal foil envelope is completely and metallurgically bonded to the fueled matrix thereby becoming a permanent part of the fueled strip. The four edges of the resulting assembly are then trimmed to the desired dimensions.

A wrought metal plate preferably of the same material as the metal foil envelope and approximately of the same thickness and width, but relatively short in respect thereto, is welded to each end of the encapsulated strip and the welded assembly annealed in a suitable furnace. This assembly is then formed into an elongated tube having a longitudinal butt seam by the action of appropriate dies and grooved rolls.

Figure 2:
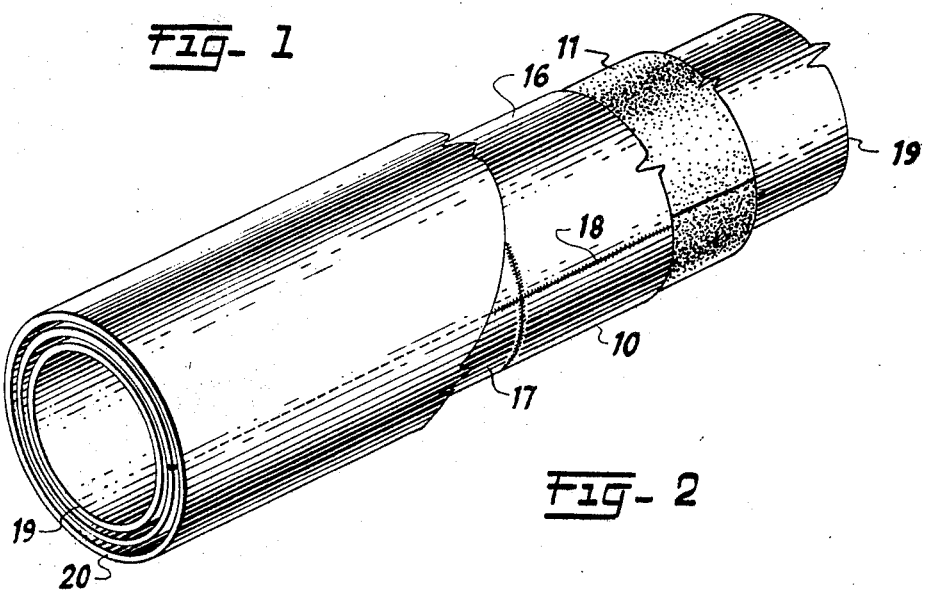
FIGURE 2 is a diagrammatic view in perspective of a tubular cermet strip positioned between a pair of metal cladding tubes immediately prior to the tube drawing step in the process of this invention for fabricating metal clad tubular fuel elements.

After forming the fueled tube, it is subjected to conventional mechanical, thermal and/or chemical cleaning processes and inserted between inner and outer metal cladding tubes which are typically .008–.020 inch in thickness and preferably formed of the same metal as the metal foil envelope. This tubular assembly has been illustrated in FIGURE 2 wherein there is shown a fueled tubular assembly 16 comprising the fueled section 11, which had previously been in strip form as seen in FIGURE 1, encapsulated in and bonded to the metal foil envelope 10 and to each end of which is welded a wrought metal plate 17. This welded tubular assembly 16 includes a longitudinal butt seam 18 and is inserted between an inner metal cladding tube 19 and an outer metal cladding tube 20. For ease of assembly, it is desirable that the clearance between the inner metal cladding tube 19 and the fueled tubular assembly 16 and the clearance between the outer metal cladding tube 20 and the fueled tubular assembly 16 be approximately .005 inch.

After the fueled tubular assembly 16 has been inserted between the metal cladding tubes 19 and 20, the wrought metal plate 17 at each end of the fueled tubular assembly 16 is welded to the adjacent sections of the cladding tubes 19 and 20. The cladding tubes 19 and 20 are then brought into mechanical contact with the fueled tubular assembly 16 and a metallurgical bond effected therebetween by a sequence of tube drawing and furnace heating treatments. For example, excellent results were obtained by reducing a three-tube assembly of stainless steel cladding tubes and a $UO_2$-stainless steel fueled tube, having an initial outside diameter of .545 inch to a final outside diameter of .500 inch in three tube drawing steps each of which was followed by heating the assembly in a hydrogen furnace for 1½ hours at 2150° F. The thickness of the fueled portion of the tubular fueled element after this tube drawing process is typically .015–.040 inch while the overall thickness of the metal clad tubular element is typically .030–.080 inch.

In order to check the tubular assembly for cladding leaks, it is placed in a pressure chamber filled with helium under a pressure of approximately 500 p.s.i. for a period of approximately 15 minutes. The assembly is then removed from the pressure chamber and completely immersed in alcohol. Any leaks in the cladding will be evidenced by bubbles rising through the alcohol.

If the above leakage test indicates that the tubular assembly includes a sound cladding, it is then placed in a high pressure gas autoclave filled with inert gas and subjected to a high pressure high temperature condition for a sufficient period of time to cause the metal therein to plastically deform in such a way as to completely remove all internal porosity from the tubular element and to effect a complete metallurgical bond between all mating surfaces of the metallic interfaces including the longitudinal butt seam of the fueled portion of the assembly. In the case of uranium dioxide-stainless steel fueled elements, it has been found sufficient to pressurize the tubes in helium for approximately 3 hours under a pressure of 10,000 p.s.i. and at a temperature of 2100° F. These three variables of time, pressure and temperature are naturally interrelated and can be modified as convenient to keep the net plastic deformation constant. For example, if it is desirable or necessary to reduce the pressure moderately, this can be compensated for by either an increase in time or temperature.

It will be noted that since the fueled strip is encapsulated in a metal envelope at an early stage of this process, it is impossible for any fuel to thereafter be lost from the surfaces thereof; consequently, all of the disadvantages of the prior art processes for forming metal clad tubular fuel elements which were due to the relatively high loss of fissionable material associated therewith have been eliminated by the process of the present invention. In addition, since the cermet strip is protected from the atmosphere by its metal foil envelope, the necessary step of reducing its thickness is no longer limited to a cold rolling process. The fact that the fueled strip is reduced to its near final thickness by hot rolling techniques results in fuel elements having greater density and less fuel fracture than heretofore possible. The use of a duplex clad, i.e., the envelope and cladding tube, constitutes an additional measure of security in that should a few minor defects in either escape detection, it is extremely unlikely that they will become aligned so as to produce a continuous flaw in the cladding.

The gas pressure bonding step of this process in effect automatically inspects the metal cladding of the tubular fuel element for perforations since a gas pressure differential will not develop across the tube if a cladding perforation exists. This situation is readily detected since a measurable decrease in wall thickness is associated with the proper bonding of the tube.

In addition this step of gas pressure bonding further improves the density of the tubular fuel element, as is clearly evidenced by the previously mentioned associated decrease in wall thickness, and produces a situation wherein subsequent ultrasonic testing of elements so produced may be performed with 100 percent reliable test results. In other words, whenever ultrasonic testing of the tubular fuel element indicates satisfactory bonding a good bond has in fact been effected and, even more important, whenever ultrasonic testing indicates a bonding weakness, there is in fact a defective bond present.

Figure 3:
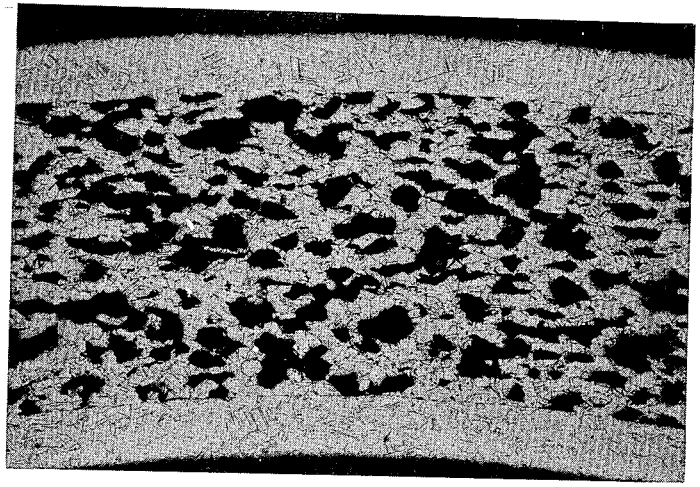
FIGURE 3 is a transverse sectional view of a metal clad tubular fuel element fabricated by a prior art process.
Figure 4:
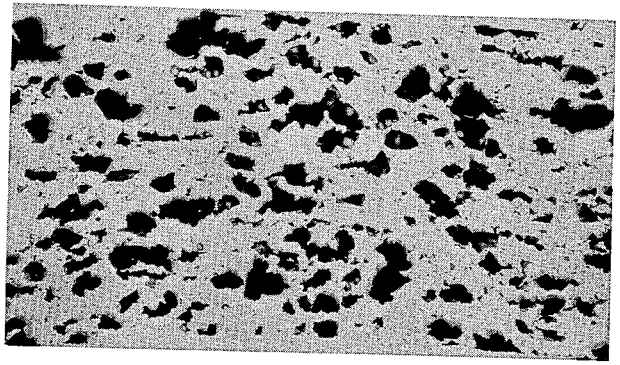
FIGURE 4 is a transverse sectional view of a metal clad tubular fuel element fabricated by the process of the present invention.
Figure 5:
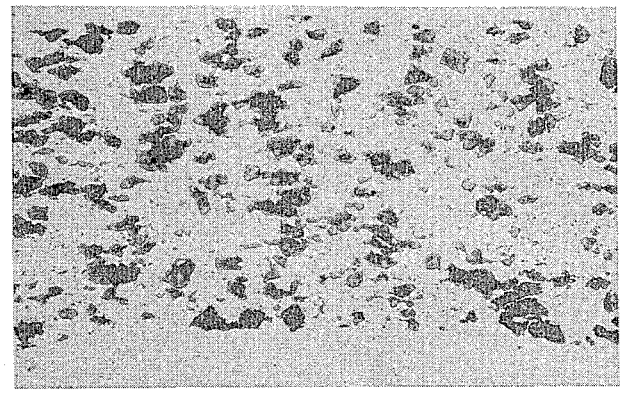
FIGURE 5 is a transverse sectional view of a metal clad tubular fuel element fabricated by the process of the present invention.

The fact that this process produces higher quality metal tubular fuel elements than those fabricated in accordance with prior art procedures is clearly evidenced by FIGURES 3 through 5. FIGURE 3 shows the microstructure of the transverse section of a tubular fuel element, magnified 75 times, having a 30 w/o uranium dioxide-70 w/o stainless steel core and stainless steel cladding. After sintering the green cermet strip and prior to its being formed into an elongated tube, this element was reduced from a thickness of .048 inch to a thickness of .032 inch in a series of 3 cold rolling steps. In FIGURE 4 there is shown the microstructure of a transverse section of a 30 w/o uranium dioxide-70 w/o stainless steel core and stainless steel clad tubular fuel element produced by the process of this invention and magnified 75 times. After sintering the green cermet strip and prior to its being formed into an elongated tube, the core of this latter fuel element was encapsulated in a stainless steel envelope approximately .004 inch in thickness and the resulting assembly reduced from a total thickness of .086 inch to a thickness of .036 inch in a series of 6 hot rolling steps. The fuel element shown in FIGURE 4 has not been subjected to the high pressure gas bonding step of the present invention. It is clearly evident from an examination of FIGURES 3 and 4 that the fuel element shown in FIGURE 4 and produced by the process of this invention is further densified than that shown in FIGURE 3 and, in addition, the fuel particles contained therein exhibit minimum fracture.

The microstructure shown in FIGURE 5 has been magnified 75 times and is that of a transverse section of a 30 w/o uranium dioxide-70 w/o stainless steel core and stainless steel clad tubular fuel element produced in accordance with the inventive process disclosed herein including the high pressure gas bonding step thereof. After encapsulating the green cermet strip in a stainless steel envelope it was reduced from a total thickness of .086 inch to a thickness of .036 inch in a series of 6 hot rolling steps and then subjected to isostatic pressing under a pressure of 10,000 p.s.i. at a temperature of 2150° F. in a helium atmosphere. This fuel element exhibits maximum density and minimum permeability. Notice should be particularly made of the degree to which the stainless steel has been forced into cracks of the uranium dioxide fuel particles and the excellence of the core-to-clad bond.

In fabricating a metal clad flat plate fuel element by the process of this invention, a green cermet fuel strip is first formed and then sintered in a manner similar to that previously described in connection with the production of tubular fuel elements. This fueled strip is positioned within a "picture frame" formed of a metal similar to or compatible with the matrix metal of the sintered core. For a reason which will shortly become obvious, it is desirable that the picture frame be slightly thinner than the fueled strip. For example, if the sintered strip is approximately .045 inch in thickness, best results will normally be attained in producing typically sized fuel elements by employing a frame having a thickness of between .035 and .040 inch. The framed fuel strip is then sandwiched between a pair of metal foil sheets which are preferably formed of the same material as the matrix metal. Since these foil sheets will constitute the final cladding of the fuel elements, they should be thicker than those employed in the process for forming tubular fuel elements and typically are between .015-.020 inch in thickness. The interior of the sandwiched assembly is evacuated and the metal foil sheets welded to the picture frame around the periphery of the fuel strip in a manner similar to that employed in the previously described tubular fuel element process. The encapsulated fueled strip is then reduced to final thickness by a series of hot rolling steps, each of which reduces the thickness of the assembly approximately 10-15 percent. The fact that the fuel strip was initially slightly thicker than the metal picture frame contributes materially to the complete filling of the frame by the fueled core. If desirable this fuel element may be isostatically bonded in accordance with the previously described process.

Metal clad flat plate fuel elements produced by this process originate in a powder rolling operation and their total reduction by rolling is at a minimum. Both of these factors result in minimum fracture of the fuel material. In addition, the elements so produced include an unusually uniform cladding. They are therefore superior to similar fuel elements produced by the common process of hot rolling a die-pressed compact of matrix metal and fissionable material.

Figure 6:
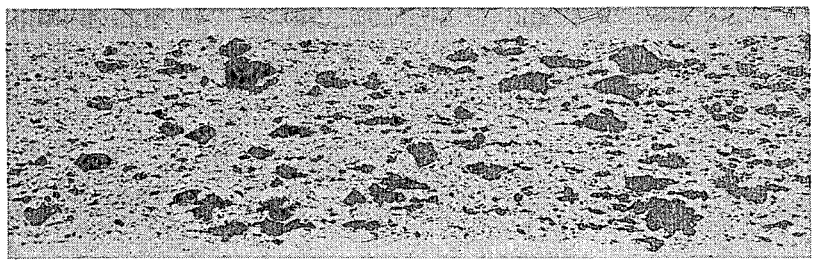
FIGURE 6 is a center longitudinal sectional view of a metal clad flat plate fuel element fabricated by the process of the present invention.
Figure 7:
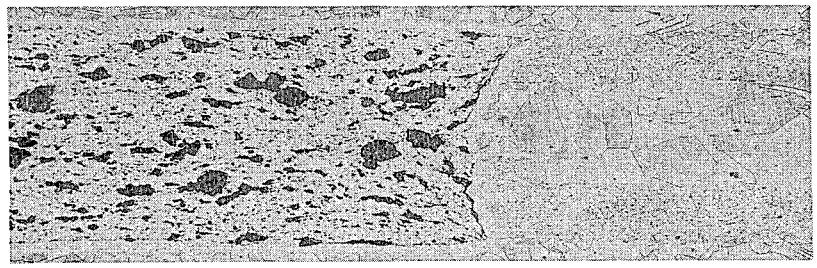
FIGURE 7 is a center transverse sectional view near the dead end of a metal clad flat plate fuel element fabricated by the process of the present invention.

FIGURES 6 and 7 show the microstructure magnified 75 times of a center longitudinal section and a center transverse section, respectively, of a 30 w/o uranium dioxide-70 w/o stainless steel core, stainless steel clad flat plate fuel element produced by the process of this invention. In producing this element a sintered strip approximately .080 inch in thickness was positioned in a stainless steel frame approximately .070 inch in thickness and the framed strip sandwiched between .018 inch stainless steel sheets. After evacuation and sealing, the sandwiched assembly was reduced in a series of 8 hot rolling steps to a final thickness of .036 inch. The fuel element as shown has not been subjected to isostatic pressing.

An examination of FIGURES 6 and 7 will reveal the uniformity of the clad thickness and the minimum of fuel particle fracture associated with flat plate fuel elements produced by this process.

This invention may be embodied in other ways without departing from the spirit or essential character thereof. The embodiments of the invention described herein are therefore illustrative and not restrictive, the scope of the invention being indicated by the appended claims and all changes which come within the meaning and range of equivalency of the claims are intended to be embraced therein.

The invention claimed is:

1. In a process for fabricating a tubular fuel element for a nuclear reactor, the improvement comprising the steps of:
   (a) encapsulating a sintered cermet strip of fissionable material and matrix metal in an evacuated metal foil envelope;
   (b) hot rolling said encapsulated strip to full density thereby effecting a metallurgical bond between said cermet strip and said envelope;
   (c) trimming the edges of said encapsulated strip to the desired dimensions;
   (d) forming said encapsulated strip into an elongated tube having a longitudinal butt seam;
   (e) positioning said elongated tube between a smaller diameter metal cladding tube and a larger diameter metal cladding tube; and
   (f) drawing the resulting three-tube assembly to produce a metallurgical bond between said elongated tube and said smaller and larger diameter metal cladding tubes.

2. The process of claim 1 wherein said fissionable material is uranium dioxide and said matrix metal and said envelope is stainless steel.

3. The process of claim 1 wherein said fissionable material is uranium dioxide and said matrix metal, said metal foil envelope, said smaller diameter tube and said larger diameter tube are stainless steel.

4. The process of claim 1 including additionally the subsequent step of gas pressure bonding said drawn tubular assembly to improve the bond of said longitudinal butt seam and said tubes and to further densify said tubular fuel element.

5. A process for fabricating a tubular fuel element for a nuclear reactor comprising the steps of:
   (a) blending a powderous mixture of fissionable material and matrix metal;
   (b) rolling said mixture into a cermet strip;
   (c) trimming said strip;
   (d) sintering said strip;
   (e) encapsulating said strip in an evacuated metal foil envelope;
   (f) hot rolling said encapsulated strip to full density and near final thickness thereby effecting a metallurgical bond between said cermet strip and said envelope;

(g) edge trimming said encapsulated strip;

(h) welding a dead end sheet metal piece to each end of said strip, each said piece being of substantially the same thickness as said encapsulated strip;

(i) forming the resulting welded assembly into an elongated tube;

(j) inserting said elongated tube between a smaller diameter metal tube and a larger diameter metal tube; and (k) drawing the resulting three-tube assembly to produce a metallurgical bond between said elongated tube and said smaller and larger diameter metal tubes.

6. The process of claim 5 wherein said fissionable material is uranium dioxide and said matrix metal, said metal foil envelope, said dead end sheet metal pieces, said smaller diameter tube and said larger diameter tube are stainless steel.

7. The process of claim 5 including additionally the step of gas pressure bonding said drawn tube assembly to improve said bond between said elongated tube and said metal tubes and the bond of the longitudinal butt seam of said elongated tube and to further densify said tubular fuel element.

8. In a process for fabricating a tubular fuel element for a nuclear reactor, the improvement comprising the steps of:

(a) forming a tubular cermet member of fissionable material and matrix metal of substantially full density having an evacuated metal foil envelope in contact with the major surfaces thereof and metallurgically bonded thereto;

(b) positioning said tubular enveloped cermet member between a smaller diameter metal cladding tube and a larger diameter metal cladding tube; and (c) drawing the resulting three-tube assembly to produce a metallurgical bond between said tubular enveloped cermet member and said smaller and larger diameter metal cladding tubes.

9. The process of claim 8 including additionally the subsequent step of gas pressure bonding said drawn tubular assembly to further improve the metallurgical bonds thereof and to further densify said tubular assemblies.

10. The process of claim 8 wherein said fissionable material is uranium dioxide and said matrix metal, said metal cladding tubes and said metal foil envelope are stainless steel.

References Cited

UNITED STATES PATENTS

| | | | |
|---|---|---|---|
| 2,725,288 | 11/1955 | Dodds et al. | 264—.5 X |
| 2,932,882 | 4/1960 | Kelly | 29—420 |
| 2,967,139 | 1/1961 | Bartoszak | 29—400 |
| 2,985,571 | 5/1961 | Binstock et al. | 75—206 |
| 2,986,504 | 5/1961 | Goslee et al. | 29—400 |
| 3,049,484 | 8/1962 | Zinn | 176—75 |
| 3,081,249 | 3/1963 | Whittemore | 264—.5 |

FOREIGN PATENTS 838,324  6/1960  Great Britain.

JOHN F. CAMPBELL, *Primary Examiner.*

P. M. COHEN, *Assistant Examiner.*

U.S. Cl. X.R.

176—75; 29—400, 497.5